(12) United States Patent
Kim (10) Patent No.: US 11,560,148 B2
(45) Date of Patent: Jan. 24, 2023

(54) INTEGRATED CONTROL APPARATUS FOR IN-WHEEL SYSTEM VEHICLE

(71) Applicants: Hyundai Motor Company, Seoul (KR); Kia Motors Corporation, Seoul (KR)

(72) Inventor: Eun Sik Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 16/996,618

(22) Filed: Aug. 18, 2020

(65) Prior Publication Data
US 2021/0316732 A1 Oct. 14, 2021

(30) Foreign Application Priority Data
Apr. 9, 2020 (KR) .................. 10-2020-0043276

(51) Int. Cl.
*B60W 30/18* (2012.01)
*B60W 30/188* (2012.01)
*B60W 10/10* (2012.01)
*B60W 10/20* (2006.01)

(52) U.S. Cl.
CPC ........ *B60W 30/1882* (2013.01); *B60W 10/10* (2013.01); *B60W 10/20* (2013.01)

(58) Field of Classification Search
CPC .. B60W 30/1882; B60W 10/10; B60W 10/20; B60W 2050/021; B60W 50/0205; B60W 2422/10; B60K 20/00; B60K 20/02; B60K 37/06; F16H 59/0217; F16H 59/08; F16H 2059/081; F16H 59/12; F16H 59/58; F16H 2059/0243; F16H 2059/082; B62D 7/1509; B62D 1/04
USPC .............................................. 701/48
See application file for complete search history.

(56) References Cited

U.S. PATENT DOCUMENTS

| 2004/0226801 A1* | 11/2004 | De Jonge | F16H 59/0204 192/220.7 |
| 2013/0138274 A1* | 5/2013 | Caldeira | G05D 1/0676 701/16 |
| 2014/0130630 A1* | 5/2014 | Kim | F16H 59/105 74/473.12 |
| 2014/0380243 A1* | 12/2014 | Furue | G06F 3/0362 715/835 |
| 2015/0130759 A1* | 5/2015 | Heo | B60K 37/06 345/174 |

(Continued)

FOREIGN PATENT DOCUMENTS

DE 102018202396 A1 * 8/2019 ............... B60D 1/00
KR 10-2012-0046583 A 5/2012

*Primary Examiner* — Jonathan M Dager
*Assistant Examiner* — Jean W Charleston
(74) *Attorney, Agent, or Firm* — Fox Rothschild LLP (57) ABSTRACT

An integrated control apparatus for in-wheel system vehicle is provided. The apparatus includes a shift button for a shift control and a dial for a steering control which are assembled integrally to each other to form one integrated component. The apparatus provides a driver with vehicle information through an operation of the dial when the steering control is not performed, and eliminates a risk of accidents occurring due to a control error by configuring a shift control manner and a steering control manner to be different from each other.

18 Claims, 11 Drawing Sheets

(56) References Cited

U.S. PATENT DOCUMENTS

| | | | |
|---|---|---|---|
| 2015/0167823 A1* | 6/2015 | Min | F16H 59/08 |
| | | | 74/473.3 |
| 2015/0227492 A1* | 8/2015 | Bai | G06F 3/04842 |
| | | | 715/762 |
| 2017/0036662 A1* | 2/2017 | Chen | B60W 30/182 |
| 2017/0291639 A1* | 10/2017 | Lavoie | B62D 1/02 |
| 2018/0194341 A1* | 7/2018 | Owen | B60W 10/20 |
| 2019/0308570 A1* | 10/2019 | Janisch | B60R 16/027 |

* cited by examiner

INTEGRATED CONTROL APPARATUS FOR IN-WHEEL SYSTEM VEHICLE

CROSS REFERENCE TO RELATED APPLICATION

The present application claims priority to Korean Patent Application No. 10-2020-0043276, filed on Apr. 9, 2020 the entire contents of which is incorporated herein for all purposes by this reference.

BACKGROUND

1. Technical Field

The present disclosure relates to an integrated control apparatus used for an in-wheel system vehicle, and more particularly, to an integrated control apparatus for an in-wheel system vehicle, in which a shift button for a shift control and a dial which is for a steering control are integrated into one component and which provide a driver with vehicle information through a control of the dial when the steering control is not performed.

2. Description of the Related Art

An eco-friendly vehicle, such as a hybrid vehicle, an electric vehicle or a fuel cell vehicle, may use a driving motor to exert driving power. Some of these vehicles may use an in-wheel system mounted with an in-wheel motor exerting driving power for each wheel of the vehicle. The in-wheel system may drive the wheel by installing an electric motor not in the engine room, but in the vehicle wheel and by transmitting the power of the motor directly to the wheel. According to implementation method, the in-wheel system may be divided into: a simple in-wheel system of a basic type in which only the motor is mounted in the wheel and coexists with an existing suspension system; and an integrated in-wheel system in which all of braking, steering and suspension systems are mounted in the wheel together with the motor.

In addition, in an in-wheel system vehicle, a system for driving the in-wheel motor may be configured of a shift-by-wire system (hereinafter referred to as SBW). Therefore, when a driver operates a control apparatus (e.g., button, dial or lever), a controller may be configured to execute an operation of the in-wheel motor mounted in each wheel. The in-wheel system vehicle may independently execute a steering of each wheel if necessary since the in-wheel motor and the steering system are mounted in each wheel.

As described above, in a prior in-wheel system vehicle in which the in-wheel motor is mounted for each wheel and the steering of each wheel may be performed independently, a shift control mechanism for a shift control and a steering control mechanism for a steering control are configured separately from each other, thereby increasing the number of components and costs. In addition, in the prior in-wheel system vehicle, there is a risk of a control error since the shift control mechanism and the steering control mechanism are configured to be operated in the same manner.

The contents described as the related art have been provided merely to assist in understanding the background of the present disclosure and should not be considered as corresponding to the related art known to those having ordinary skill in the art.

SUMMARY

An object of the present disclosure is to provide an integrated control apparatus for an in-wheel system vehicle, in which a shift button for a shift control and a dial for a steering control are integrated into one component, the number of components and costs may be reduced, and marketability may be improved by providing a driver with vehicle information through an operation of the dial particularly when the steering control is not performed. Another object of the present disclosure is to eliminate a risk of accidents occurring due to a control error by configuring a shift control manner and a steering control manner to be different from each other through a configuration in which the shift control is performed using the button and the steering control is performed using the dial.

According to an exemplary embodiment of the present disclosure, an integrated control apparatus for an in-wheel system vehicle may include: a dial rotated relative to a housing fixed to a console; a shift button accommodated in the dial and protruding upward to be press-controlled; and a printed circuit board (PCB) configured to detect a rotation of the dial when the dial is rotated and recognize a button signal when the shift button is operated. The integrated control apparatus for an in-wheel system vehicle may further include a steering button positioned on a side of the shift button, wherein when the steering button is operated and then the dial is rotated, one mode may be selected among various steering modes.

The integrated control apparatus for an in-wheel system vehicle may further include an information button which is positioned on the console and of which a control signal may be recognized by the PCB, wherein when the information button is operated and then the dial is rotated, one of various vehicle information may be selected and provided to a driver. The apparatus may further include: an actuator fixedly installed in the housing and having a plunger moved forward and backward; and a slider coupled to the plunger and operated to cover or open the steering button while the plunger is moved forward and backward, wherein the PCB may be configured to further include a function of executing an operation of the actuator.

Additionally, the integrated control apparatus may include: a lower cover coupled onto the housing; and a return spring returning the rotated dial to an original position by being coupled to the lower cover and the dial in such a manner that both ends of the return spring are supported by the lower cover and the dial, respectively. A bullet may be elastically installed on the dial using a bullet spring as a medium to protrude toward the housing; a guide groove may be formed in the housing to guide a movement of the bullet when the bullet is inserted into the housing and the dial is rotated; and a bottom surface of the guide groove may be formed of a wave-shaped groove in contact with the bullet and providing senses of smooth and moderate operations when the dial is rotated.

The integrated control apparatus may further include an upper cover through which the shift button and the steering button penetrate. The slider may be coupled to the upper cover to be linearly movable. An outer circumferential surface of the dial may be formed as a curved portion having a cross-sectional shape concave inward the dial to prevent a side surface of the dial from protruding outward from the upper cover to prevent a control error of the dial.

The shift button protruding upward by penetrating through the upper cover may include a reverse (R)-stage button, a neutral (N)-stage button and a drive (D)-stage button, which are arranged in a line; the steering button may be positioned on a side of the N-stage button; and due to the movement of the slider, only the N-stage button may be exposed upward or the N-stage button and the steering button may be simultaneously exposed. The shift button may further include a park (P)-stage button which is positioned on the console and of which a control signal may be recognized by the PCB.

The slider may have a button aperture that penetrates therethrough in a vertical direction. When the slider is moved, through the button aperture, only the N-stage button may be exposed upward, or the N-stage button and the steering button may be simultaneously exposed upward. The steering button may be set to have a lower height than the N-stage button and positioned below the slider, thereby preventing interference between the slider and the steering button when the slider is moved.

A plurality of display windows may be installed on the console to each indicate a selected steering mode when the dial is rotated after the steering button is operated. The steering modes respectively displayed on the display windows may include a front wheel steering mode, a front and rear wheel in-same-direction steering mode, a front and rear wheel in-opposite-direction steering mode and a diagonal-direction steering mode in which front wheels and rear wheels are rotated in the same diagonal direction. A permanent magnet may be coupled to the dial to face the PCB; and the PCB may be configured to detect the rotation of the dial through a change in magnetic field intensity based on a change in a position of the permanent magnet when the dial is rotated.

The integrated control apparatus for an in-wheel system vehicle may further include: a connection rod connected to the dial; and a step motor connected to the connection rod through a motor shaft. The dial may return to an original position by power of the step motor. When the steering button is covered by the slider, when the driver press-controls the shift button, an in-wheel motor provided in each wheel may be driven based on a selected shift stage. Additionally, when the steering button is covered by the slider, when the driver engages a brake pedal and operates either the N-stage button or the P-stage button, the steering button may be exposed to the outside by the movement of the slider based on the operation of the actuator; and when the driver press-controls the exposed steering button and then rotates the dial, one mode may be selected among the various steering modes.

When the driver operates either the R-stage button or the D-stage button after selecting the steering mode, the steering button may be blocked from being exposed to the outside by the movement of the slider based on the operation of the actuator. When the driver engages an accelerator pedal, the vehicle may be operated in the selected steering mode. When the dial is rotated at a particular angle or greater after the operation of the vehicle is ended in the selected steering mode, the steering mode of the vehicle may be automatically set to the front wheel steering mode in which a steering control is possible only for the front wheels.

According to another exemplary embodiment of the present disclosure, an integrated control apparatus for an in-wheel system vehicle is provided in which a shift button press-controlled for a shift control and a dial rotatably controlled for a steering control are assembled integrally to each other to form one component.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
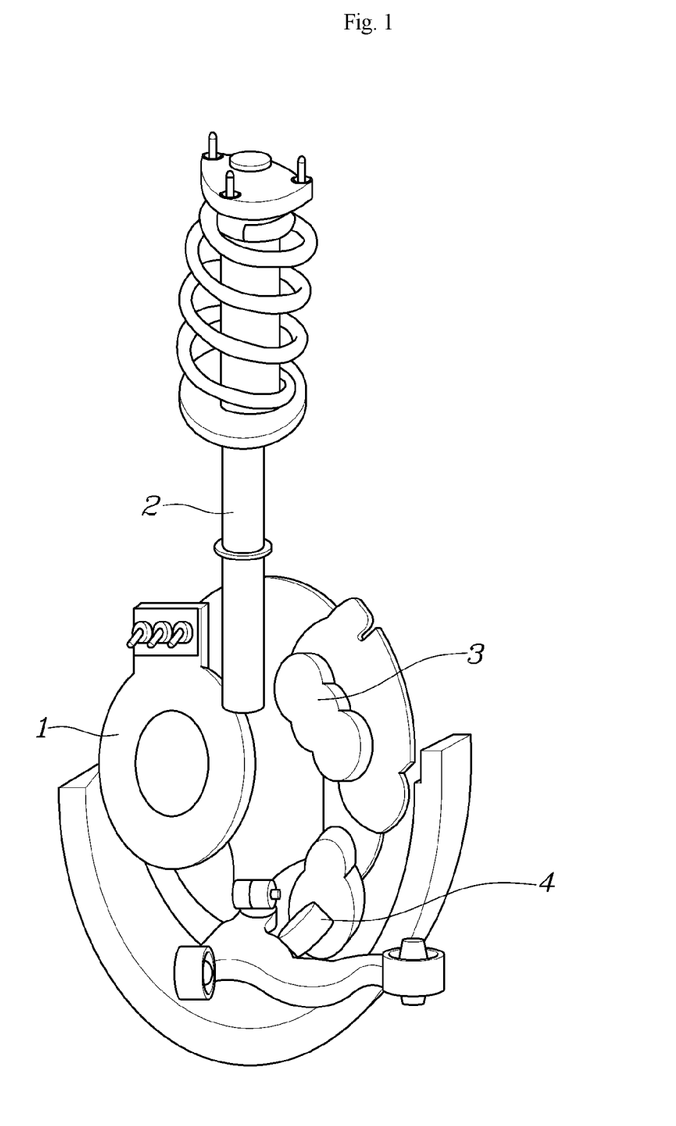
FIG. 1 is a view for describing an in-wheel system according to the present disclosure.
Figure 2:
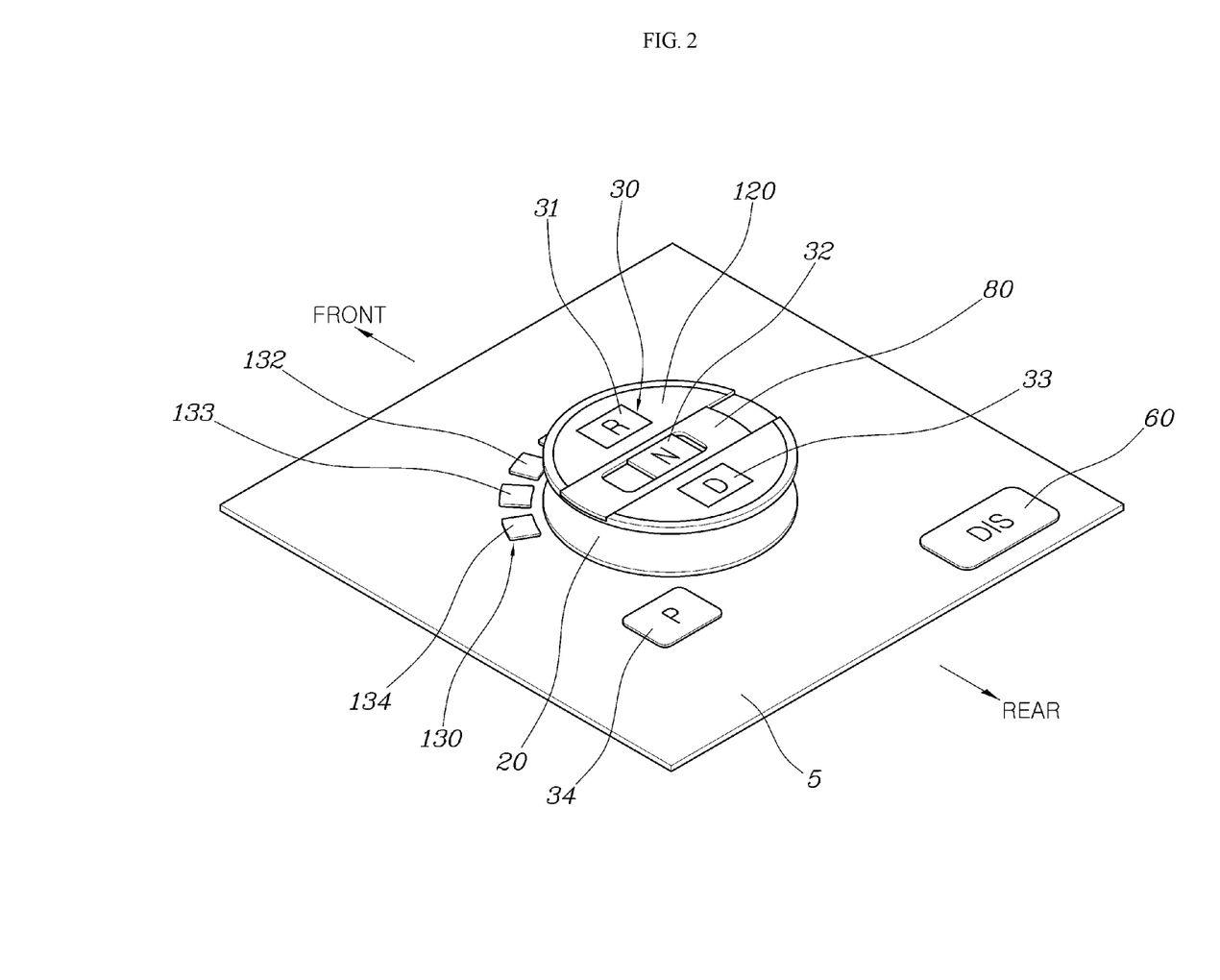
FIG. 2 is a view illustrating that an integrated control apparatus for an in-wheel system vehicle is installed in a console according to the present disclosure.
Figure 3:
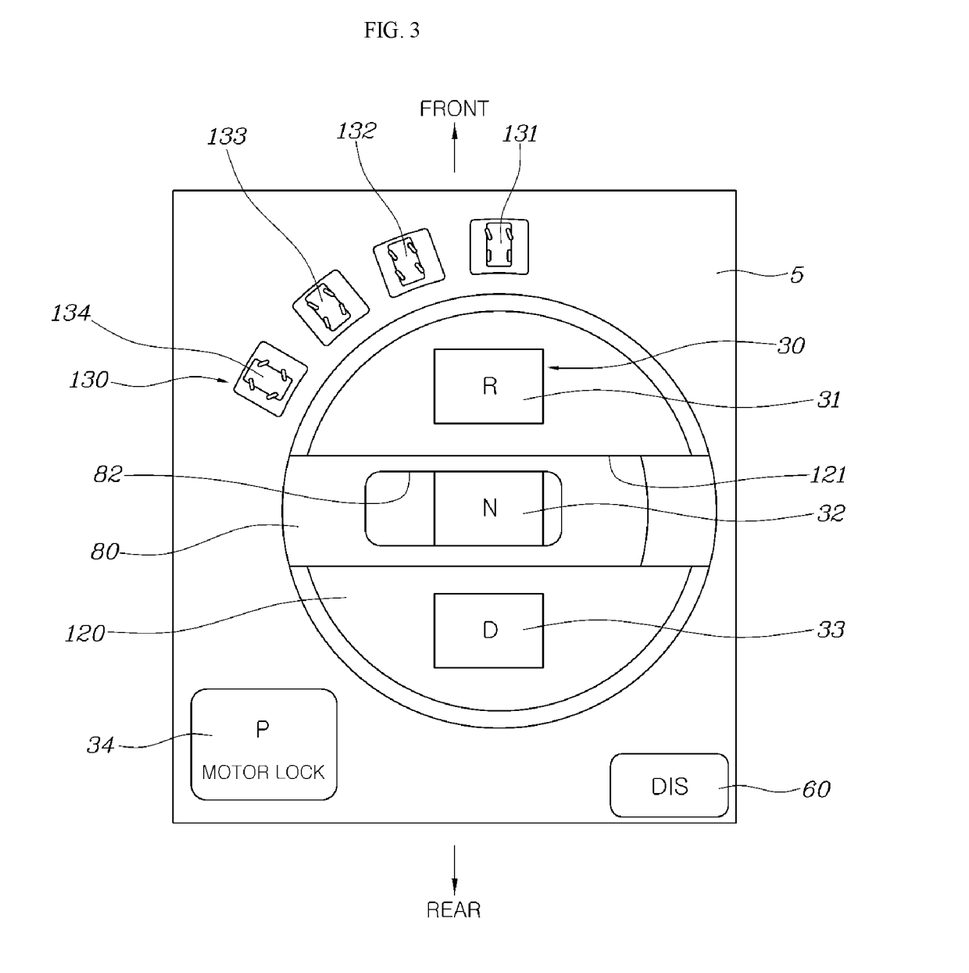
FIGS. 3 and 4 are a plan view and an exploded perspective view of FIG. 2, respectively according to the present disclosure.
Figure 4:
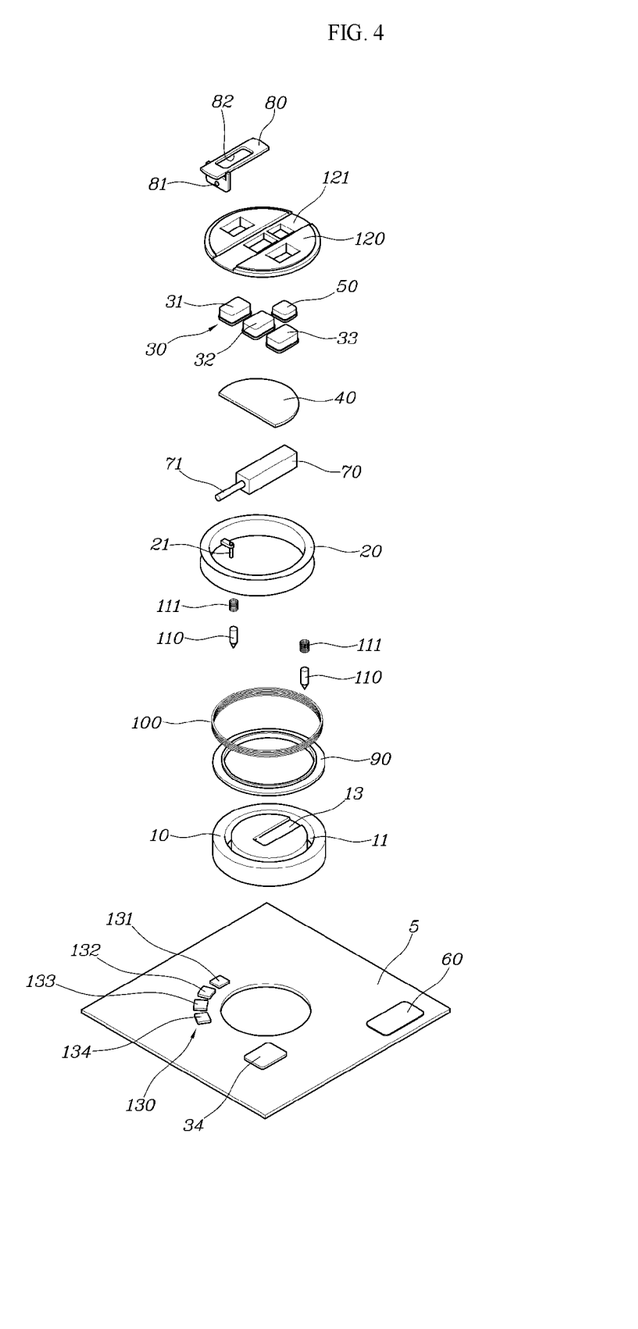
Figure 5:
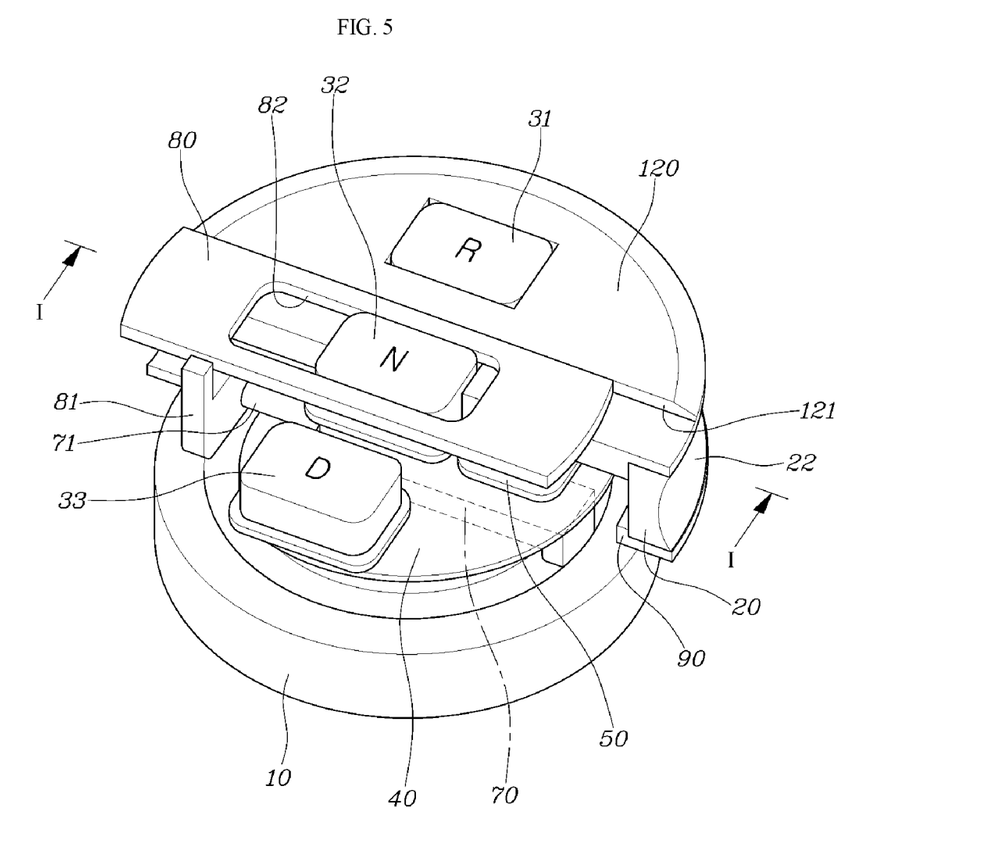
FIG. 5 is a partial cut-away view of an integrated control apparatus according to the present disclosure.
Figure 6:
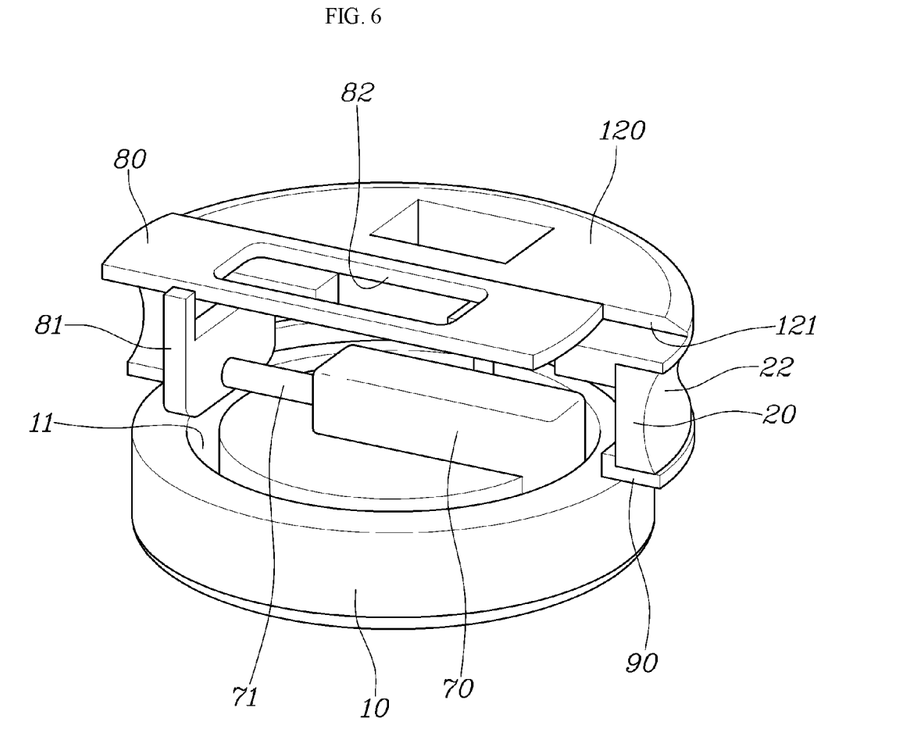
FIG. 6 is a view of a state in which a printed circuit board (PCB), a shift button and an information button are removed from FIG. 5 according to the present disclosure.
Figure 7:
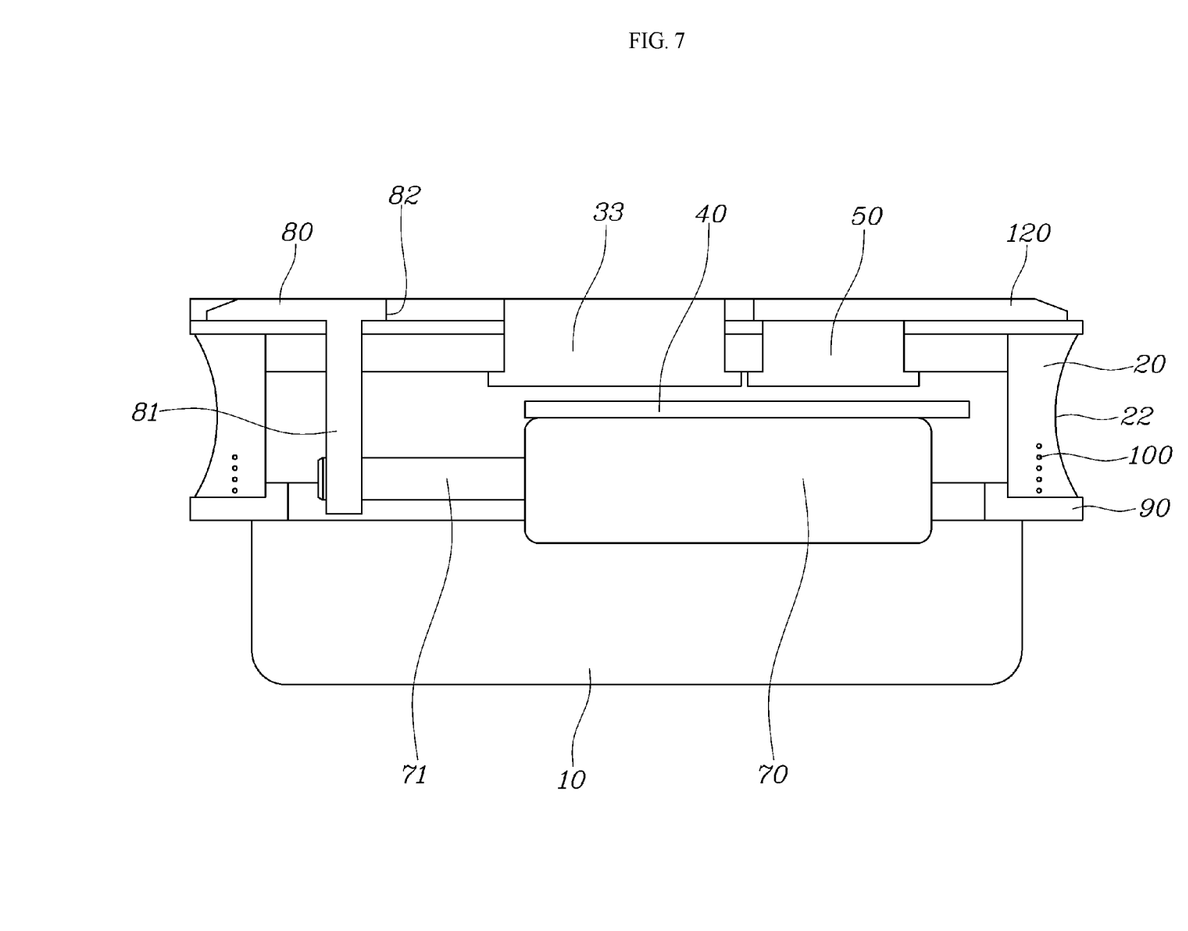
FIG. 7 is a cross-sectional view taken along line I-I of FIG. 5 according to the present disclosure.
Figure 8:
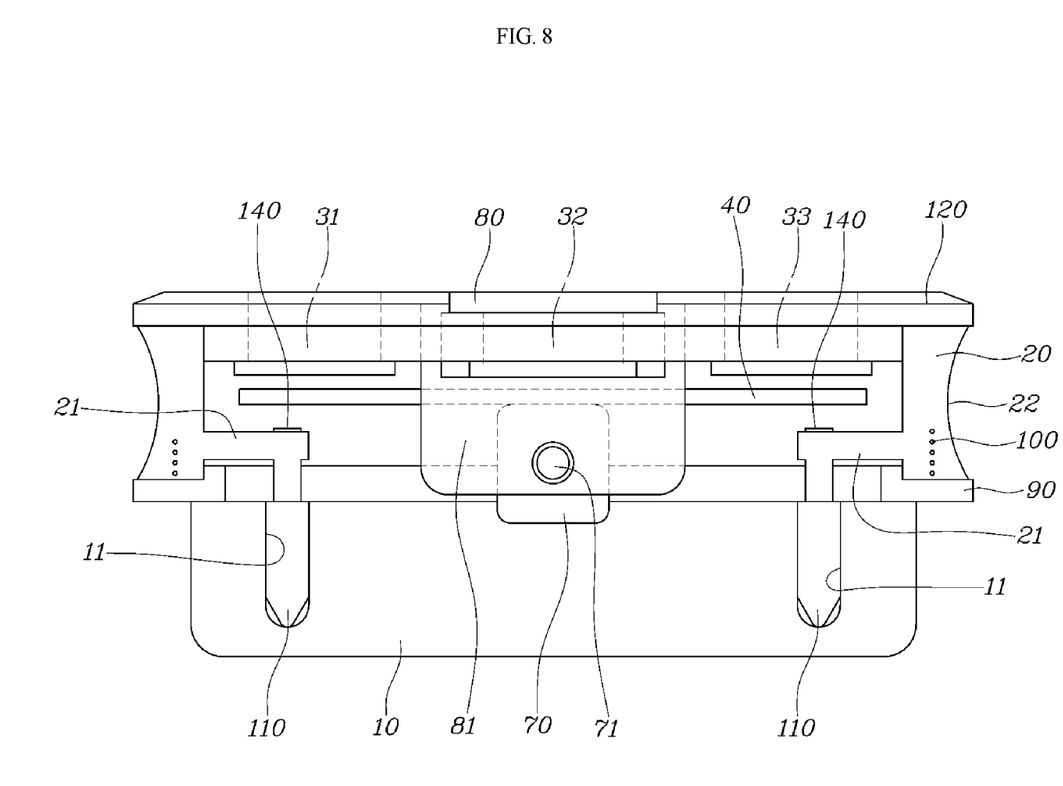
FIG. 8 is a left side view of FIG. 7 according to the present disclosure.

Hereinafter, an integrated control apparatus for an in-wheel system vehicle according to exemplary embodiments of the present disclosure is described with reference to the accompanying drawings. As illustrated in FIG. 1, the in-wheel system according to the present disclosure may have a configuration of an integrated in-wheel system in which all of an electric damper 2, an electric brake 3 and an electric steering mechanism 4 are mounted in each wheel together with an in-wheel motor 1.

As illustrated in FIGS. 2 to 11, the integrated control apparatus for an in-wheel system vehicle according to the present disclosure may include: a dial 20 rotated relative to a housing 10 fixed to a console 5; a shift button 30 accommodated in the dial 20 and protruding upward to be press-controlled; and a printed circuit board (PCB) 40 configured to detect a rotation of the dial 20 when the dial 20 is rotated and recognize a button signal when the shift button 30 is operated.

The housing 10 may be formed in a shape of a circle having a predetermined thickness. With respect to the console 5, the housing 10 may be positioned below the console 5 and the dial 20 as well as the shift button 30 may be positioned above the console 5. The integrated control apparatus may further include: a steering button 50 positioned on a side of the shift button 30; and an information button 60 (i.e. driver information system (DIS)) which is positioned on the console 5 and of which a control signal may be recognized by the PCB 40 (e.g., the processor of the PCB).

When a driver operates the steering button 50 and then rotates the dial 20, one mode may be selected among various steering modes. In addition, when the driver operates the information button 60 and then rotates the dial 20, one of various vehicle information may be selected and provided to the driver. The steering mode selected by the rotation of the dial 20 may be displayed on a display window to be described below, and may also be displayed on a head up display (HUD), a cluster, and an audio video navigation (AVN), if necessary. In addition, the vehicle information selected by the rotation of the dial 20 may be provided to the driver through the HUD, the cluster and the AVN.

The integrated control apparatus may further include: an actuator 70 fixedly installed in the housing 10 and having a plunger 71 moved forward and backward; and a slider 80 coupled to the plunger 71 and operated to cover or open the steering button 50 while the plunger 71 is moved forward and backward. For example, the actuator 70 may include a linear motor; and the PCB 40 may be configured to execute an operation of the actuator 70. On the slider 80, a slider protrusion 81 may be formed to protrude in a right angle direction and coupled with the plunger 71. The slider protrusion 81 may slide left and right during the forward/backward movement of the plunger 71 to cover or open the steering button 50.

Additionally, the integrated control apparatus may include: a lower cover 90 fixedly coupled onto the housing 10; and a return spring 100 that returns the dial 20 rotated in one direction to an original position by being coupled to the lower cover 90 and the dial 20 in such a manner that both ends of the return spring are supported by the lower cover 90 and the dial 20, respectively. The lower cover 90 may be a ring-shaped plate of which a center is open in a vertical direction. A bottom surface of the lower cover 90 may be fixedly coupled onto the housing 10; a bottom surface of the dial 20 may be rotatably seated on a top surface of the lower cover 90; the return spring 100 may be positioned between the lower cover 90 and the dial 20; and the return spring 100 may be a coil spring. However, the present disclosure is not limited hereto.

Figure 9:
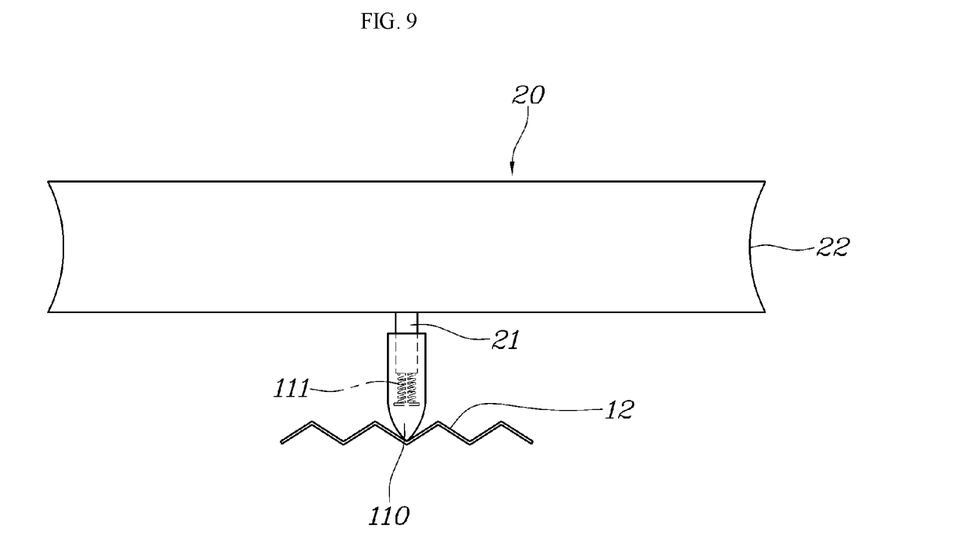
FIG. 9 is a view for describing a state in which a bullet coupled to a dial is in contact with a groove formed in a housing according to the present disclosure.

According to the present disclosure, dial protrusions 21 each having an L shape and protruding downward may be provided on an inner circumferential surface of the dial 20. In particular, the two dial protrusions 21 may be positioned at 180 degree intervals. A bullet 110 may be installed on each of the dial protrusions 21 using a bullet spring 111 as a medium to protrude toward the housing 10; and a guide groove 11 may be formed in the housing 10 to guide a movement of the bullet 110 when the bullet 110 is inserted into the housing 10 and the dial 20 is rotated. The bullet 110 elastically installed on the dial 20 using the bullet spring 111 as the component may determine a position of the rotated dial 20; the guide groove 11 may be formed to be open through a top surface of the housing 10; and a bottom surface of the guide groove 11 may be formed of a wave-shaped groove 12 in contact with the bullet 110 and providing senses of smooth and moderate operations when the dial 20 is rotated.

The integrated control apparatus may further include an upper cover 120 through which the shift button 30 and the steering button 50 penetrate, wherein the slider 80 may be coupled to the upper cover 120 to be linearly movable in left and right directions. An actuator groove 13 may be formed in a central portion of the housing 10 to fixedly seat the actuator 70 on the housing 10, and a slider groove 121 to which the slider 80 is movably fitted in the left and right directions may be formed in the upper cover 120.

An outer circumferential surface 22 of the dial 20 may be formed as a curved portion having a cross-sectional shape concave inward the dial. This configuration may prevent the outer circumferential surface 22 of the dial 20 from protruding outward from the upper cover 120. In particular, this configuration may prevent a side (e.g., outer circumferential) surface of the dial 20 from protruding outward from the upper cover 120 to prevent an unwanted control error of the dial 20.

According to the present disclosure, the shift button 30 protruding upward by penetrating through the upper cover 120 may include a reverse (R)-stage button 31, a neutral (N)-stage button 32 and a drive (D)-stage button 33, which are arranged in a line; the steering button 50 may be positioned on a side of the N-stage button 32; and due to the movement of the slider 80, only the N-stage button 32 may be exposed upward or the N-stage button 32 and the steering button 50 may be simultaneously exposed.

Further, apertures for installations of the N-stage button 32 and the steering button 50 may be formed to penetrate through the slider groove 121 formed in the upper cover 120 in the vertical direction; and a aperture through which the R-stage button 31 penetrates and a aperture through which the D-stage button 33 penetrates may be formed on portions above and below the slider groove 121 in the upper cover 120, respectively. The slider 80 may have a button aperture 82 penetrating therethrough in the vertical direction; and when the slider is moved, upward through the button aperture 82 only the N-stage button 32 may be exposed or the N-stage button 32 and the steering button 50 may be simultaneously exposed upward.

The steering button 50 may be set to have a lower height than the N-stage button 32 and positioned below the slider 80, thereby preventing interference between the slider 80 and the steering button 50 when the slider 80 is moved. In addition, the shift button 30 may further include a park (P)-stage button 34 which is positioned on the console 5 and of which a control signal may be recognized by the PCB 40. When the P-stage button 34 is pressed, engaged, or otherwise operated, the in-wheel motor 1 mounted in each wheel may implement a lock operation. A plurality of display windows 130 may be installed on the console 5 to each indicate a selected steering mode when the dial 20 is rotated after the steering button 50 is controlled.

The steering modes respectively displayed on the display windows 130 may include: a front wheel steering mode in which a steering control may be possible only for front wheels (i.e. front left and front right wheels); a front and rear wheel in-same-direction steering mode in which both the front wheels and rear wheels (i.e. rear left and rear right wheels) face the same direction; a front and rear wheel in-opposite-direction steering mode in which the front wheels and the rear wheels face each other in a direction opposite to each other; and a diagonal-direction steering mode in which the front wheels and the rear wheels are rotated in the same diagonal direction. Accordingly, the display windows 130 may include a front wheel steering mode display window 131, a front and rear wheel in-same-direction steering mode display window 132, a front and rear wheel in-opposite-direction steering mode display window 133 and a diagonal-direction steering mode display window 134.

The front wheel steering mode is a mode in which only the front wheels may be steered; the front and rear wheel in-same-direction steering mode is a mode which may reduce a rotation radius of the wheels and particularly, enable a horizontal parking of the vehicle; the front and rear wheel in-opposite-direction steering mode is a mode in which the wheels may be rotated in a narrow space since the rotation radius may be reduced as much as possible. The diagonal-direction steering mode is a mode which is advantageous for a parking of the vehicle since this mode may change a direction of the vehicle in any direction by allowing the vehicle to be rotated in place.

A permanent magnet 140 may be coupled to each of the dial protrusions 21 provided on the dial 20 to face the PCB 40; and the PCB 40 may be configured to detect the rotation of the dial 20 through a change in magnetic field intensity based on a change in a position of the permanent magnet 140 when the dial 20 is rotated. The PCB 40 configured to detect the rotation of the dial 20 through the change in a position of the permanent magnet 140 may be configured to transmit a signal for selecting a steering mode or a signal for selecting vehicle information based on the steering button 50 or the information button 60, which are operated before the rotation of the dial 20.

Figure 11:
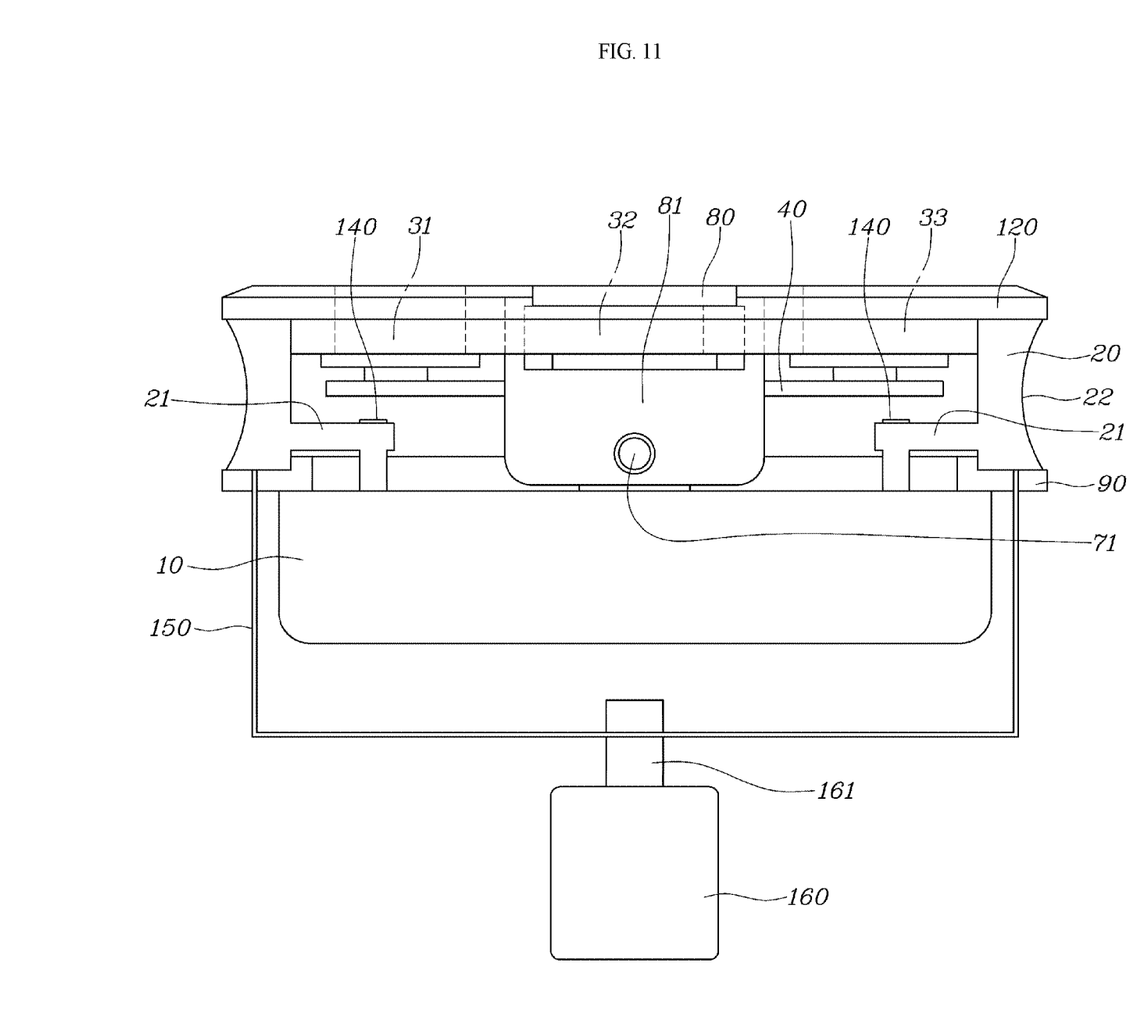
FIG. 11 is a view for describing that a dial is connected to a step motor through a connection rod according to another exemplary embodiment of the present disclosure.

Meanwhile, according to another exemplary embodiment of the present disclosure, as illustrated in FIG. 11, a connection rod 150 instead of the return spring 100 may be configured to be connected to the dial 20. In particular, when connected to a step motor 160 through the connection rod 150 and a motor shaft 161, the dial 20 may be configured to return to an original position electrically by power of the step motor 160.

Figure 10:
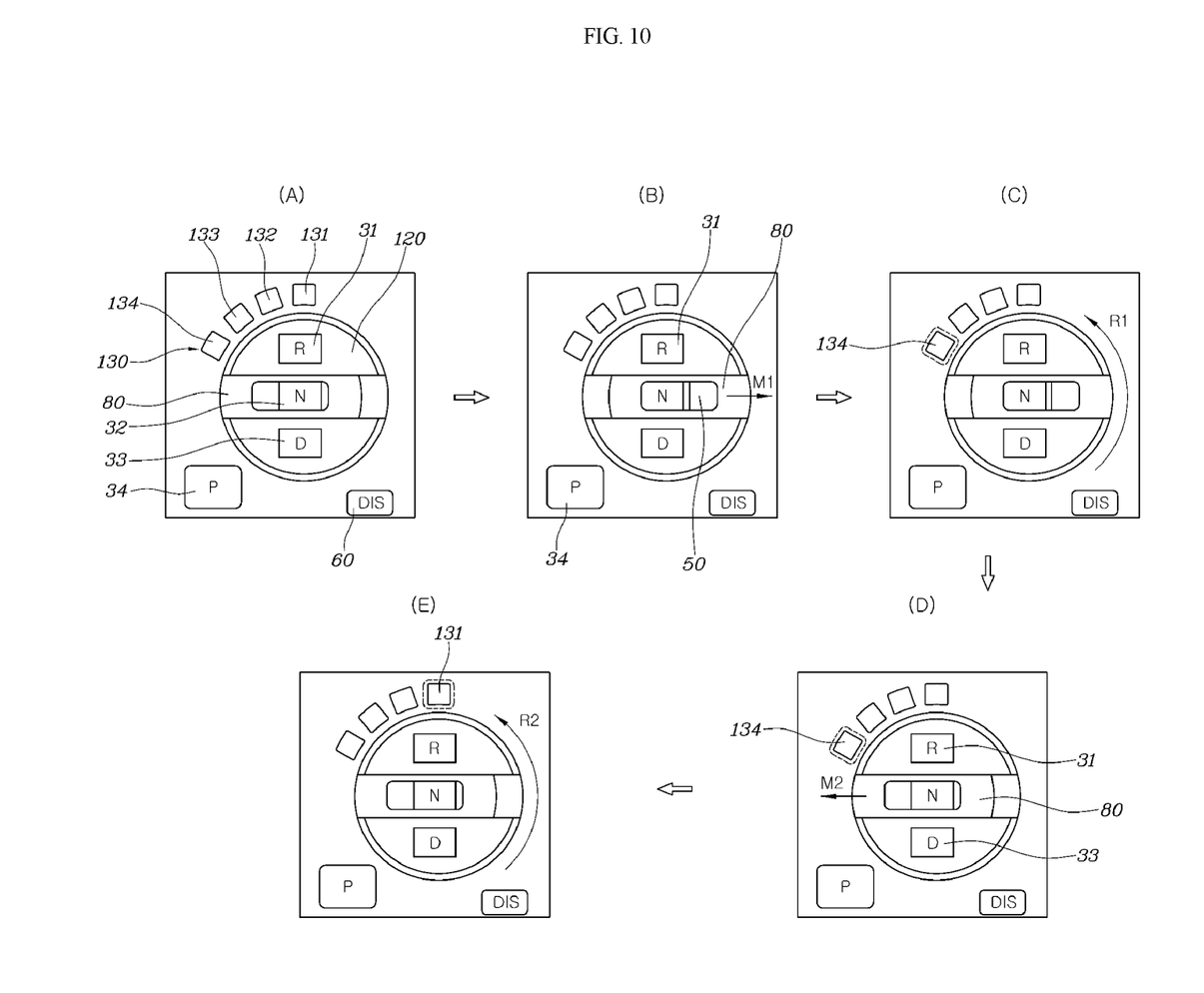
FIG. 10 is a view for describing an operation process of an integrated control apparatus according to the present disclosure.

Hereinafter, an operation of the embodiments of the present disclosure is described with reference to FIG. 10. In FIG. 10, state A illustrates an initial state in which the steering button 50 is covered by the slider 80. In the initial state, when the driver press-controls the shift button 30, the in-wheel motor 1 provided in each wheel may be driven based on a selected shift stage.

In addition, in the initial state, in response to the driver press-controlling the information button 60 and then rotating the dial 20, one of various vehicle information may be selected and provided to the driver through the HUD, the cluster and AVN. In the initial state as illustrated in state A, when the driver engages a brake pedal and operates either the N-stage button 32 or the P-stage button 34, the steering button 50 may be exposed to the outside (state B) by the movement of the slider 80 (as indicated by arrow M1) based on the operation of the actuator 70; and in response to the driver press-controlling the exposed steering button 50 and then rotating the dial 20 (as indicated by arrow R1), one steering mode desired by the driver may be selected among the various steering modes (state C).

Further, state C is a state in which the diagonal-direction steering mode is selected among the various steering modes, and the selected mode may be displayed through the diagonal-direction steering mode display window 134. In response to the driver operating either the R-stage button 31 or the D-stage button 33 after selecting the one steering mode, i.e. the diagonal-direction steering mode, as in state C, the steering button may be blocked from being exposed to the outside (state D) by the movement of the slider 80 (as indicated by arrow M2) based on the operation of the actuator 70; and subsequently, when the driver engages an accelerator pedal, the vehicle may be operated in the selected steering mode (e.g., diagonal-direction steering mode).

In addition, when the dial 20 is rotated (as indicated by arrow R2) by the driver at a particular angle or greater (i.e. by one click or more along the groove) after the operation of the vehicle is ended in the steering mode (e.g., diagonal-direction steering mode) selected in state D, the steering mode of the vehicle may be automatically set to the front wheel steering mode in which the steering control is possible only for the front wheels (state E). This state allows the vehicle to be in a general drive mode, and the integrated control apparatus according to the present disclosure may return to the initial state as illustrated in state A to prepare for a next operation.

As described above, in the integrated control apparatus for an in-wheel system vehicle according to the present disclosure, the shift button 30 for the shift control and the dial 20 for the steering control may be assembled integrally to each other to form one integrated component. Through this configuration, the number of components and costs may be reduced. In addition, marketability may be improved by providing the driver with the vehicle information through an operation of the dial 20 particularly when the steering control is not performed. In addition, the exemplary embodiments according to the present disclosure may eliminate a risk of accidents occurring due to the control error by configuring the shift control manner and the steering control manner to be different from each other through a configuration in which the shift control is performed using the shift button 30 and the steering control is performed using the dial 20.

Although the present disclosure is shown and described with respect to specific exemplary embodiments, it is obvious to those skilled in the art that the present disclosure may be variously modified and altered without departing from the spirit and scope of the present disclosure as defined by the following claims.

What is claimed is:

1. An integrated control apparatus for an in-wheel system vehicle, comprising:
   a dial rotated relative to a housing fixed to a console;
   a shift button accommodated in the dial and protruding upward to be operated;
   a printed circuit board (PCB) configured to detect a rotation of the dial when the dial is rotated and recognize a button signal in response to the shift button being operated;
   a steering button positioned on a side of the shift button, wherein in response to the steering button being operated and then the dial being rotated, one mode is selected among various steering modes; and
   a plurality of display windows installed on the console to each indicate a selected steering mode when the dial is rotated after the steering button is operated;
   wherein the steering modes respectively displayed on the display windows include a front wheel steering mode, a front and rear wheel in-same-direction steering mode, a front and rear wheel in-opposite-direction steering mode, and a diagonal-direction steering mode in which front wheels and rear wheels are rotated in the same diagonal direction.

2. The integrated control apparatus for an in-wheel system vehicle of claim 1, further comprising an information button which is positioned on the console and of which a control signal is recognized by the PCB,
   wherein in response to the information button being operated and then the dial being rotated, one of various vehicle information is selected and provided to a driver.

3. The integrated control apparatus for an in-wheel system vehicle of claim 1, further comprising:
   an actuator fixedly installed in the housing and having a plunger moved forward and backward; and
   a slider coupled to the plunger and operated to cover or open the steering button while the plunger is moved forward and backward,
   wherein the PCB is configured to execute an operation of the actuator.

4. The integrated control apparatus for an in-wheel system vehicle of claim 3, further comprising:
   an upper cover through which the shift button and the steering button penetrate,
   wherein the slider is coupled to the upper cover to be linearly movable.

5. The integrated control apparatus for an in-wheel system vehicle of claim 4, wherein an outer circumferential surface of the dial is formed as a curved portion having a cross-sectional shape concave inward the dial to prevent a side surface of the dial from protruding outward from the upper cover to prevent a control error of the dial.

6. The integrated control apparatus for an in-wheel system vehicle of claim 4, wherein:
   the shift button protruding upward by penetrating through the upper cover includes a reverse (R)-stage button, a neutral (N)-stage button and a drive (D)-stage button, which are arranged in a line;
   the steering button is positioned on a side of the N-stage button; and
   due to the movement of the slider, only the N-stage button is exposed upward or the N-stage button and the steering button are simultaneously exposed.

7. The integrated control apparatus for an in-wheel system vehicle of claim 6, wherein the shift button includes a park (P)-stage button which is positioned on the console and of which a control signal is recognized by the PCB.

8. The integrated control apparatus for an in-wheel system vehicle of claim 6, wherein the slider includes a button aperture penetrating therethrough in a vertical direction; and when the slider is moved, through the button aperture, only the N-stage button is exposed upward or the N-stage button and the steering button are simultaneously exposed upward.

9. The integrated control apparatus for an in-wheel system vehicle of claim 6, wherein the steering button is set to have a lower height than the N-stage button and positioned below the slider to prevent interference between the slider and the steering button when the slider is moved.

10. The integrated control apparatus for an in-wheel system vehicle of claim 7, wherein in a state in which the steering button is covered by the slider, when the shift button is operated, an in-wheel motor provided in each wheel is driven based on a selected shift stage.

11. The integrated control apparatus for an in-wheel system vehicle of claim 7,
    wherein in the state in which the steering button is covered by the slider, when the brake pedal is engaged and either the N-stage button or the P-stage button are operated, the steering button is exposed to the outside by the movement of the slider based on the operation of the actuator; and
    when the exposed steering button is operated and then the dial is rotated, one mode is selected among the various steering modes.

12. The integrated control apparatus for an in-wheel system vehicle of claim 11, wherein when either the R-stage button or the D-stage button is operated after selection of the steering mode, the steering button is blocked from being exposed to the outside by the movement of the slider based on the operation of the actuator; and when an accelerator pedal is engaged, the vehicle is operated in the selected steering mode.

13. The integrated control apparatus for an in-wheel system vehicle of claim 12, wherein when the dial is rotated at a particular angle or greater after the operation of the vehicle is ended in the selected steering mode, the steering mode of the vehicle is automatically set to the front wheel steering mode in which a steering control is possible only for the front wheels.

14. The integrated control apparatus for an in-wheel system vehicle of claim 1, further comprising:
    a lower cover coupled onto the housing; and
    a return spring that returns the rotated dial to an original position by being coupled to the lower cover and the dial and both ends of the return spring are supported by the lower cover and the dial, respectively.

15. The integrated control apparatus for an in-wheel system vehicle of claim 1, wherein:
    a bullet is elastically installed on the dial using a bullet spring as a medium to protrude toward the housing;
    a guide groove is formed in the housing to guide a movement of the bullet when the bullet is inserted into the housing and the dial is rotated; and
    a bottom surface of the guide groove is formed of a wave-shaped groove in contact with the bullet.

16. The integrated control apparatus for an in-wheel system vehicle of claim 1, wherein a permanent magnet is coupled to the dial to face the PCB; and the PCB is configured to detect the rotation of the dial through a change in magnetic field intensity based on a change in a position of the permanent magnet when the dial is rotated.

17. The integrated control apparatus for an in-wheel system vehicle of claim 1, further comprising:
- a connection rod connected to the dial; and
- a step motor connected to the connection rod through a motor shaft,
- wherein the dial is configured to return to an original position by power of the step motor.

18. The integrated control apparatus for an in-wheel system vehicle of claim 1, wherein the shift button press-controlled for a shift control and the dial rotatably operated for a steering control are assembled integrally to each other to form one component.

* * * * *